(12) United States Patent
Villani et al.

(10) Patent No.: US 12,428,178 B2
(45) Date of Patent: Sep. 30, 2025

(54) SYSTEM AND METHOD FOR CONTROLLING A FLOW REGULATING VALVE IN A FILLING MACHINE

(71) Applicant: Tetra Laval Holdings & Finance S.A., Pully (CH)

(72) Inventors: Federica Villani, Formigine (IT); Nicola Garuti, Scandiano (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/693,677

(22) PCT Filed: Sep. 15, 2022

(86) PCT No.: PCT/EP2022/075603
§ 371 (c)(1),
(2) Date: Mar. 20, 2024

(87) PCT Pub. No.: WO2023/046558
PCT Pub. Date: Mar. 30, 2023

(65) Prior Publication Data
US 2024/0400243 A1    Dec. 5, 2024

(30) Foreign Application Priority Data
Sep. 22, 2021   (EP) .................................... 21198294

(51) Int. Cl.
*B65B 3/26* (2006.01)
*B65B 3/10* (2006.01)
(Continued)

(52) U.S. Cl.
CPC ................. *B65B 3/10* (2013.01); *B65B 3/30* (2013.01); *B65B 9/213* (2013.01); *B65B 51/144* (2013.01);
(Continued)

(58) Field of Classification Search
CPC .. B65B 3/10; B65B 3/30; B65B 9/213; B65B 51/144; B65B 57/145; B65B 55/103; G05D 7/0635
See application file for complete search history.

(56) References Cited

U.S. PATENT DOCUMENTS 5,472,312 A * 12/1995 Takeda ..................... G05D 9/12
                                                      415/24
6,684,609 B1 * 2/2004 Bassissi ................ B65B 57/145
                                                      53/503
(Continued)

FOREIGN PATENT DOCUMENTS

EP        1053940 A1    11/2000
EP        0900345 B1    8/2007
(Continued)

OTHER PUBLICATIONS

EP Office Action received in EP Application No. 22195768.1 as mailed Jan. 23, 2024 in 12 pages.
(Continued)

*Primary Examiner* — Nicolas A Arnett
(74) *Attorney, Agent, or Firm* — Knobbe, Martens, Olson & Bear, LLP

(57) ABSTRACT

A method for controlling a flow regulating valve (6) of a filling machine (1), controlling the flow of pourable food product, envisages: receiving an inlet pressure measurement ($P_{IN}$) from a pressure sensor (14); receiving an inlet flow measurement ($F_{IN}$) from a flow meter (16); determining a control signal ($S_c$) for controlling an operating position of the flow regulating valve (6) by combined contributions ($C_1$, $C_2$) of a flow feedback control module (22), receiving at its input a flow set point ($F_{SP}$) and the inlet flow measurement ($F_{IN}$) and generating a first control contribution ($C_1$) indicative of a difference between the inlet flow measurement and the flow set point; and a flow feed-forward control module (Continued)

(20), receiving at its input the inlet pressure measurement ($P_{IN}$) and the flow set point ($F_{SP}$) and generating a second control contribution ($C_2$) as a function of the flow set point and inlet pressure measurement, using pre-stored fluid-dynamic maps, which may be a result of a characterization of the flow regulating valve in a test condition. The flow feed-forward control module uses the fluid dynamics maps in a dynamically adaptive manner, depending on different operating conditions of the filling machine and/or the related pourable food product, thereby adapting to the same different operating conditions and/or the pourable food product.

15 Claims, 7 Drawing Sheets

(51) Int. Cl.
    *B65B 3/30*     (2006.01)
    *B65B 9/213*     (2012.01)
    *B65B 51/14*     (2006.01)
    *B65B 57/14*     (2006.01)
    *G05D 7/06*     (2006.01)
    *B65B 55/10*     (2006.01)

(52) U.S. Cl.
    CPC ......... *B65B 57/145* (2013.01); *G05D 7/0635* (2013.01); *B65B 55/103* (2013.01)

(56) References Cited

U.S. PATENT DOCUMENTS

| | | | | |
|---|---|---|---|---|
| 7,313,901 | B2 * | 1/2008 | Kakita | B65B 31/045 |
| | | | | 53/434 |
| 10,082,806 | B2 * | 9/2018 | Takijiri | G05D 7/0635 |
| 2002/0119249 | A1 * | 8/2002 | Kevin | G05D 9/12 |
| | | | | 427/249.19 |
| 2010/0180951 | A1 * | 7/2010 | Smirnov | G05D 7/0635 |
| | | | | 137/511 |
| 2011/0054702 | A1 * | 3/2011 | Smirnov | G05D 7/0635 |
| | | | | 700/282 |
| 2016/0264392 | A1 * | 9/2016 | Malmberg | B67C 3/287 |
| 2016/0297660 | A1 * | 10/2016 | D'Errico | B67C 3/20 |
| 2020/0346911 | A1 * | 11/2020 | D'Errico | B67C 3/286 |
| 2023/0244253 | A1 * | 8/2023 | Bassissi | G05D 16/2013 |
| | | | | 53/451 |

FOREIGN PATENT DOCUMENTS

| | | |
|---|---|---|
| JP | S60-159916 | 8/1985 |
| JP | 2011-204265 A | 10/2011 |

OTHER PUBLICATIONS

International Search Report and Written Opinion received in PCT Application No. PCT/EP2022/075603 as mailed Dec. 20, 2022 in 11 pages.

* cited by examiner

SYSTEM AND METHOD FOR CONTROLLING A FLOW REGULATING VALVE IN A FILLING MACHINE

TECHNICAL FIELD

The present invention relates to a system and a method for controlling a flow regulating valve in a filling machine for filling composite packages with a pourable food product.

BACKGROUND ART

As is known, many liquid or pourable food products, such as fruit juice, UHT (ultra-high-temperature treated) milk, wine, tomato sauce, etc., are distributed and marketed in composite packages made of a multilayer composite packaging material.

A typical example is the parallelepiped-shaped package for pourable food products known as Tetra Brik Aseptic™, which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Composite packages of this sort are normally produced within fully automatic filling (or, also denoted as, packaging) plants, which at least form the composite packages starting from a web of multilayer composite packaging material (wound from a reel) and fill the composite packages with the pourable food product.

A typical packaging plant comprises at least a filling machine, which forms the composite packages from the multilayer composite packaging material and fills the composite packages with the pourable food product. Additionally, packaging plants may also comprise downstream treatment equipment, receiving the composite packages from the filling machine and executing additional treatments on the composite packages; the downstream treatment equipment may for example comprise one or more of a buffer unit for temporarily buffering the composite packages; an application unit for applying e.g. straws on the composite packages; a grouping unit, e.g. a palletizer unit, for grouping a plurality of composite packages together in a storing unit (such as a pallet).

With reference to FIG. 1, a filling machine 1, sometimes also referred to as a packaging machine, is generally illustrated by way of example, being in particular a roll-fed filling machine used for filling liquid or pourable food products in multilayer composite packages 2.

Multilayer composite packaging material may comprise at least a layer of fibrous material, such as e.g. a paper or cardboard layer, and at least two layers of heat-seal plastic material, e.g. polyethylene, interposing the layer of fibrous material in between one another. One of these two layers of heat-seal plastic material defines an inner face of the composite packages 2 eventually contacting the pourable food product packaged within the same composite packages 2.

Multilayer composite packaging material may also comprise a layer of gas- and light-barrier material, e.g. aluminum foil or ethylene vinyl alcohol (EVOH) film, in particular being arranged between one of the layers of the heat-seal plastic material and the layer of fibrous material. Preferentially, multilayer composite packaging material may also comprise a further layer of heat-seal plastic material being interposed between the layer of gas- and light-barrier material and the layer of fibrous material.

In particular, the multilayer composite packaging material is provided in the form of a web, in particular being wound up on a packaging material reel 3, from which it is fed through the filling machine 1 in a web feeding direction A; a tube 4 is formed in the filling machine 1 from the web by producing a longitudinal sealing.

The liquid food product is fed into the tube 4 via a pipe 5 and a regulating valve 6 is used for regulating a flow of the liquid food product through the pipe 5, reaching the tube 4 and filling the packages 2. In particular, the regulating valve 6 couples the pipe 5 to a processing line 7, which is configured to process (in any known manner) the liquid food product before its packaging (the processing line 7 being also coupled to a tank or similar storage element 7').

A lower end 8 of the tube 4 is fed into a folding device 9, in which a transversal sealing is produced, the tube 4 being folded according to folding lines, also referred to as weakening lines, and then cut off such that the composite packages 2 filled of the liquid food product are formed.

As shown in the same FIG. 1, the filling machine 1 can further comprise a sterilization device S, e.g. a hydrogen peroxide bath or an LVEB (Low-Voltage Electron Beam) station, for ensuring that the web is free from unwanted microorganisms, before the formation of the tube 4.

The filling machine 1 further comprises a control unit 10, which (in addition to other functions, here not illustrated, for managing operation of the filling machine 1) is operatively coupled to the regulating valve 6 and configured to provide to the same regulating valve 6 a control signal $S_c$ to modulate its position and thereby regulate the flow of liquid through the pipe 5 and into the tube 4.

The control unit 10 for example includes a PLC (Programmable Logic Controller) or any suitable processing and computing unit, configured to execute a computer program designed to generate the above control signal $S_c$ for the regulating valve 6.

European patent application No. 21180243 filed on 18 Jun. 2021 in the name of the present Applicant, discloses an advantageous and effective solution for controlling the regulating valve 6 by the control unit 10.

In particular, according to this solution, the filling machine 1 further comprises a pressure sensor 14 for determining an inlet pressure measurement $P_{IN}$ of the liquid food product fed from the processing line 7 towards the pipe 5 in the same filling machine 1. The determined inlet pressure measurement $P_{IN}$ is provided to the control unit 10 (in a wired or wireless manner).

In particular, the pressure sensor 14 is arranged upstream of the regulating valve 6, with respect to the direction of flow of the liquid food product towards the pipe 5 into the filling machine 1.

The filling machine 1 further comprises a flow meter 16 and a level detector 18.

The flow meter 16 determines an inlet product flow measurement $F_{IN}$ of the liquid food product fed from the processing line 7 to the filling machine 1; and the level detector 18 determines a product level measurement $L_M$ of the liquid food product that is fed from the pipe 5 into the tube 4 for filling of the packages 2.

The determined product flow and level measurements $F_{IN}$, $L_M$ are also provided to the control unit 10 (again, in a wired or wireless manner).

In particular, the flow meter 16 is also arranged upstream of the regulating valve 6, with respect to the direction of flow of the liquid food product into the filling machine 1; and the level detector 18 is arranged in any suitable manner (e.g. in proximity of the tube 4), so as to detect the level of fluid inside the same tube 4 (e.g. in a non-contact manner, via an electromagnetic-type measurement).

The inlet pressure, product flow and product level measurements may be referred to as filling control parameters, based on which the control unit 10 controls the regulating valve 6 and generates the corresponding control signal $S_c$.

As disclosed in the above-mentioned patent application Ser. No. 21/180,243 (and as will also be detailed in the following), the control unit 10 is configured to implement a flow proportional-integral-derivative (PID) module, receiving at its input a flow set point and the inlet product flow measurement $F_{IN}$. An output of the flow PID module is indicative of a difference between a real flow, measured by means of the flow meter 16, and a desired flow, represented by the flow set point.

The control unit 10 is further configured to implement a flow feed-forward (FF) module, receiving at its input the inlet pressure measurement $P_{IN}$ from the pressure sensor 14 and the flow set point.

The flow feed forward module generates a direct control output as a function of the flow set point and inlet pressure measurement $P_{IN}$, using fluid-dynamic maps, which are a result of characterization of the regulating valve 6 in a test condition.

The outputs of the flow proportional-integral-derivative (PID) module and the flow feed-forward module (both indicative of a position of the regulating valve 6) are combined in the control unit 10, to generate the control signal $S_c$ for the regulating valve 6, which is therefore adjusted as a function of the combined outputs.

Use of the inlet pressure measurement $P_{IN}$ as an input of the flow feed forward control module is particularly advantageous, since it allows to adjust the regulating valve 6 also based on real-time pressure measurements from the processing line 7, so that the same regulating valve 6 can quickly adapt to pressure changes and fluctuations in the same processing line 7. For instance, in case of a pressure drop in the processing line 7, for example due to product line disturbances, the regulating valve 6 may be adjusted to compensate for this pressure drop.

A fast reaction to disturbances is therefore achieved and a stable operation for the filling machine 1 is provided, with reduced packaging material and product waste with respect to known control solutions (without the above discussed pressure sensor 14).

The control unit 10 may further comprise an outer level PID control module, receiving at its inputs a level set point and the product level measurement $L_M$ and generating an output being indicative of a difference between a real product level, measured by means of the level detector 18, and a desired level, represented by the level set point, that is used to provide the above discussed flow set point.

The control unit 10 implements in this case a double PID control loop for an even more accurate control action, based on the pressure and level measurements, in order to adjust the flow through the regulating valve 6.

The present Applicant has realized that, although advantageous, the above-discussed control solution may be improved.

In particular, the predetermined fluid-dynamic maps stored and used in the flow feed-forward control module are based on a characterization of the flow regulating valve 6 performed in a test rig (i.e. with the same valve separated from the filling machine 1), with a predefined liquid, in particular water, as the liquid flowing therethrough. Therefore, only a pressure drop on the regulating valve 6 and water viscosity properties may be taken into account in the model of the flow regulating valve 6 represented by the fluid-dynamic maps.

The present Applicant has realized that, when the filling machine 1 is supposed to handle products with higher viscosity, or in the presence of high pressure drop in the filling line due to the corresponding capacity/volume, the predetermined fluid-dynamic maps may need to be adjusted in that the regulating valve 6 may be initially set to a slightly offset position. As a consequence, the control unit 10 may be slower to react to pressure disturbances (in this case, mainly through the action of the flow PID control module, which, as is known, is slower to compensate for the same disturbances).

Even though known filling machines operate satisfyingly well, the present Applicant has therefore realized that a need is felt for an improved solution for controlling the related flow regulating valve, which adjusts the flow of the liquid food product filling the packages being formed.

DISCLOSURE OF INVENTION

It is therefore an object of the present solution to provide an improved system and method for controlling the flow regulating valve, which allow to satisfy, at least in part, the above-mentioned need.

According to the present solution, a control method and system are therefore provided, as defined in the appended claims.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
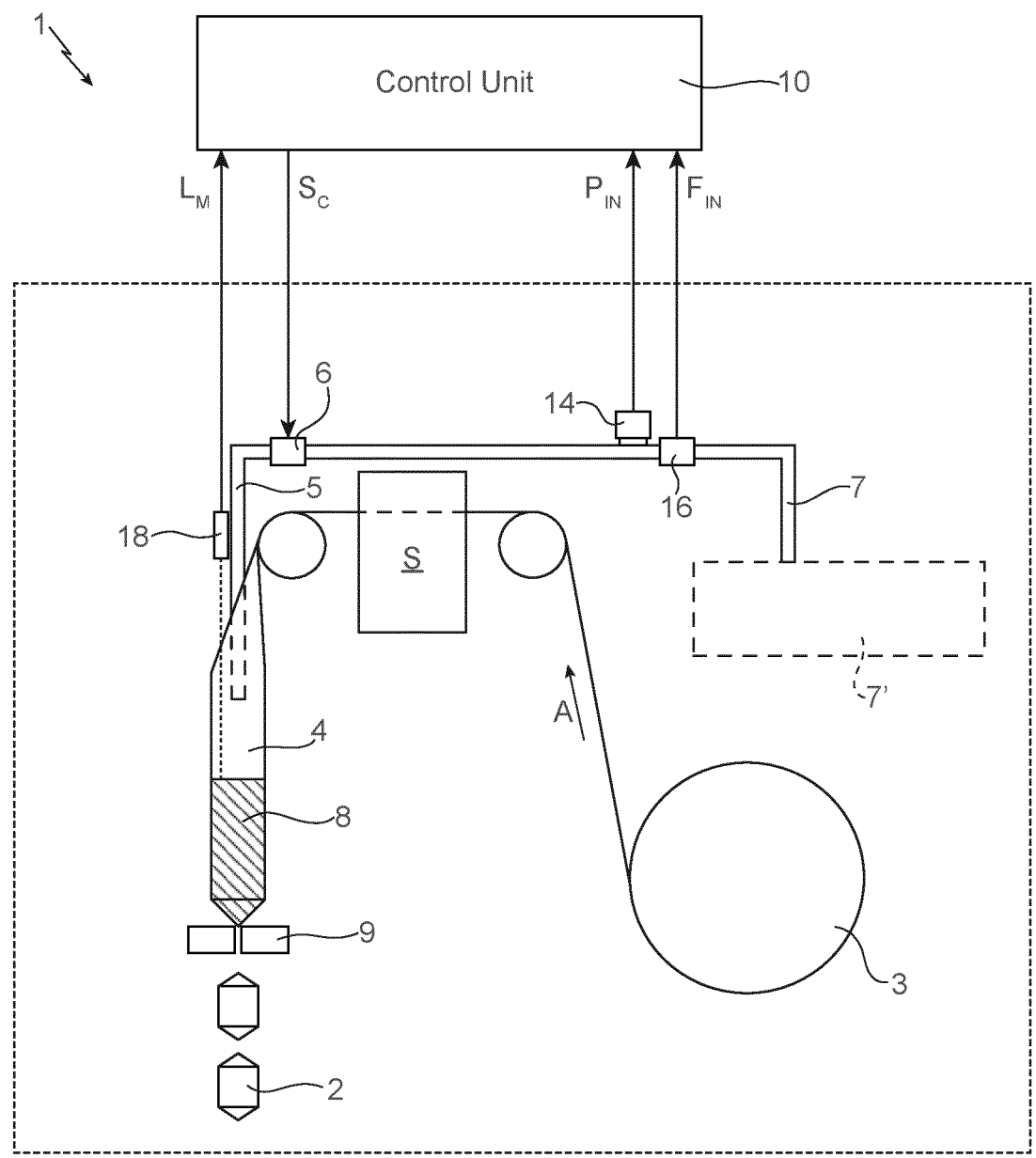
FIG. 1 is a schematic representation of a known filling machine with a control unit for controlling a corresponding flow regulating valve.
Figure 2:
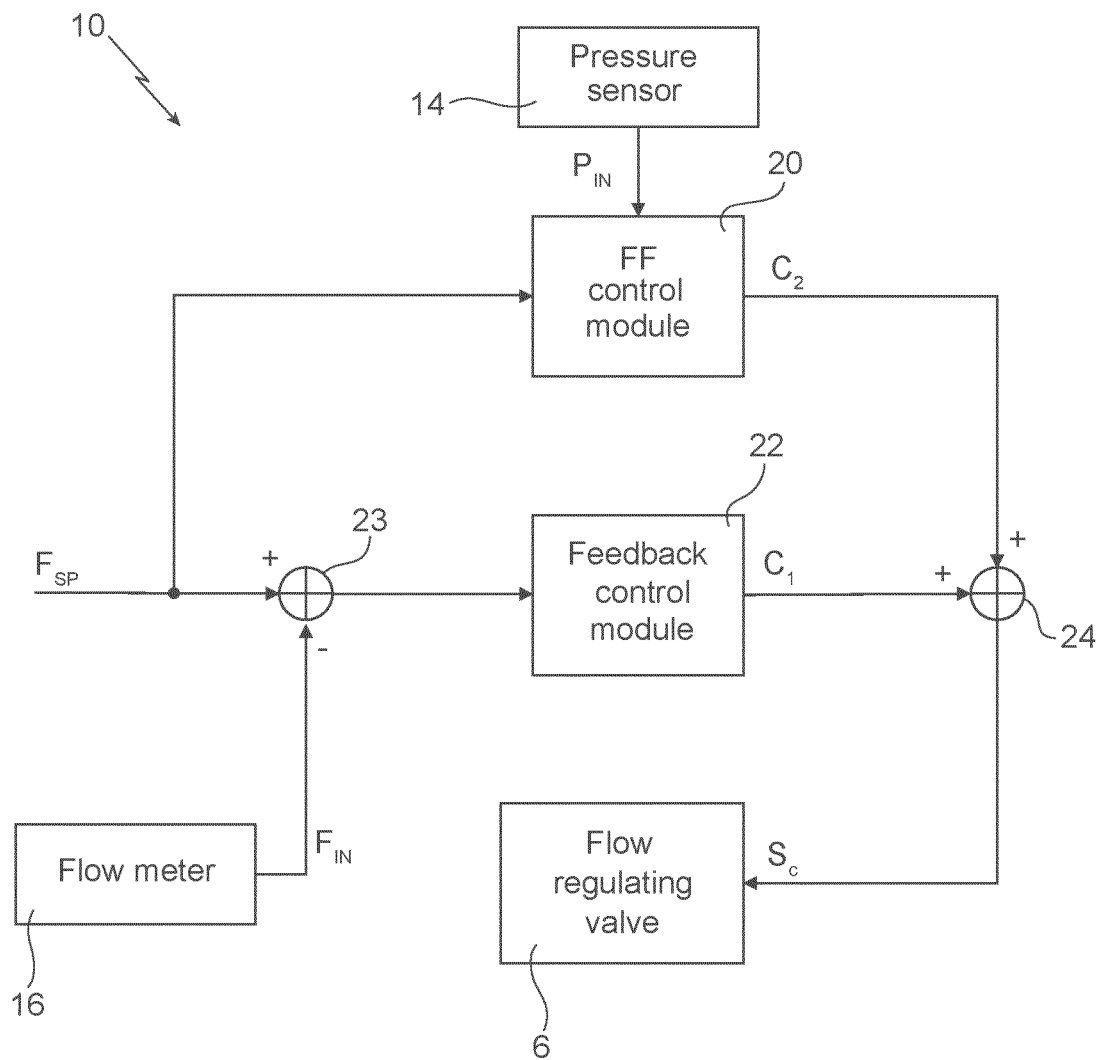
FIG. 2 is a schematic block diagram of the control unit of the filling machine, according to a possible embodiment.

FIG. 2 (where elements similar to those discussed above with reference to FIG. 1 are denoted with the same references) shows a schematic block diagram of a control unit 10, for controlling a flow regulating valve 6 in a filling machine 1 (the same filling machine 1 being e.g. arranged and configured as previously disclosed with reference to FIG. 1).

The control unit 10 is configured to receive the above discussed filling control parameters, and in particular: the inlet pressure measurement, $P_{IN}$, from the pressure sensor 14; and the inlet product flow measurement, $F_{IN}$, from the flow meter 16.

The control unit 10 comprises:
- a flow feed-forward (FF) control module 20, receiving at its input the inlet pressure measurement $P_{IN}$ from the pressure sensor 14 and, moreover, a flow set point, $F_{SP}$; and
- a flow feedback control module 22, receiving at its input the same flow set point $F_{SP}$ and the inlet product flow measurement $F_{IN}$ from the flow meter 16 (in the example being arranged and operating in parallel to the flow feed-forward control module 20).

The flow set point $F_{SP}$ is indicative of a target flow of product through the regulating valve 16 and into the pipe 5 towards the tube 4. The flow set point $F_{SP}$ may be determined as a function of one or more of a start flow percentage, a nominal flow percentage, a machine speed flow percentage, a level set point and/or a product level (as measured by level detector 18).

In a possible embodiment, the flow feedback control module 22 is implemented by a proportional-integral-derivative (PID) module, which generates at its output a first control contribution $C_1$, based on a difference between the inlet product flow measurement $F_{IN}$ measured by means of the flow meter 16 (and representing a real flow) and the flow set point $F_{SP}$ (representing a desired flow), according to proportional, integrative and derivative control actions (in any known manner, here not discussed in detail).

As shown in the same FIG. 2, the above difference between the inlet product flow measurement $F_{IN}$ and the flow set point $F_{SP}$ is performed in a summing block 23, whose output represents the input of the flow feedback control module 22.

The flow feed-forward control module 20 generates at its output a second control contribution $C_2$, as a function of the flow set point $F_{SP}$ and the inlet pressure measurement $P_{IN}$, using the pre-set fluid-dynamic maps, which are a result of characterization of the flow regulating valve 6 in a test condition, as previously discussed.

The first and second control contributions $C_1$, $C_2$ are combined (in particular, added) in a summing block 24, which generates at the output the control signal $S_c$ for the flow regulating valve 6 of the filling machine 1, for modulating its position (the position of the valve ranging from a closed position to a fully open position) and thereby adjusting the flow of the liquid food product passing therethrough into the pipe 5 and then into the tube 4 for the formation of the filled packages 12.

Figure 3:
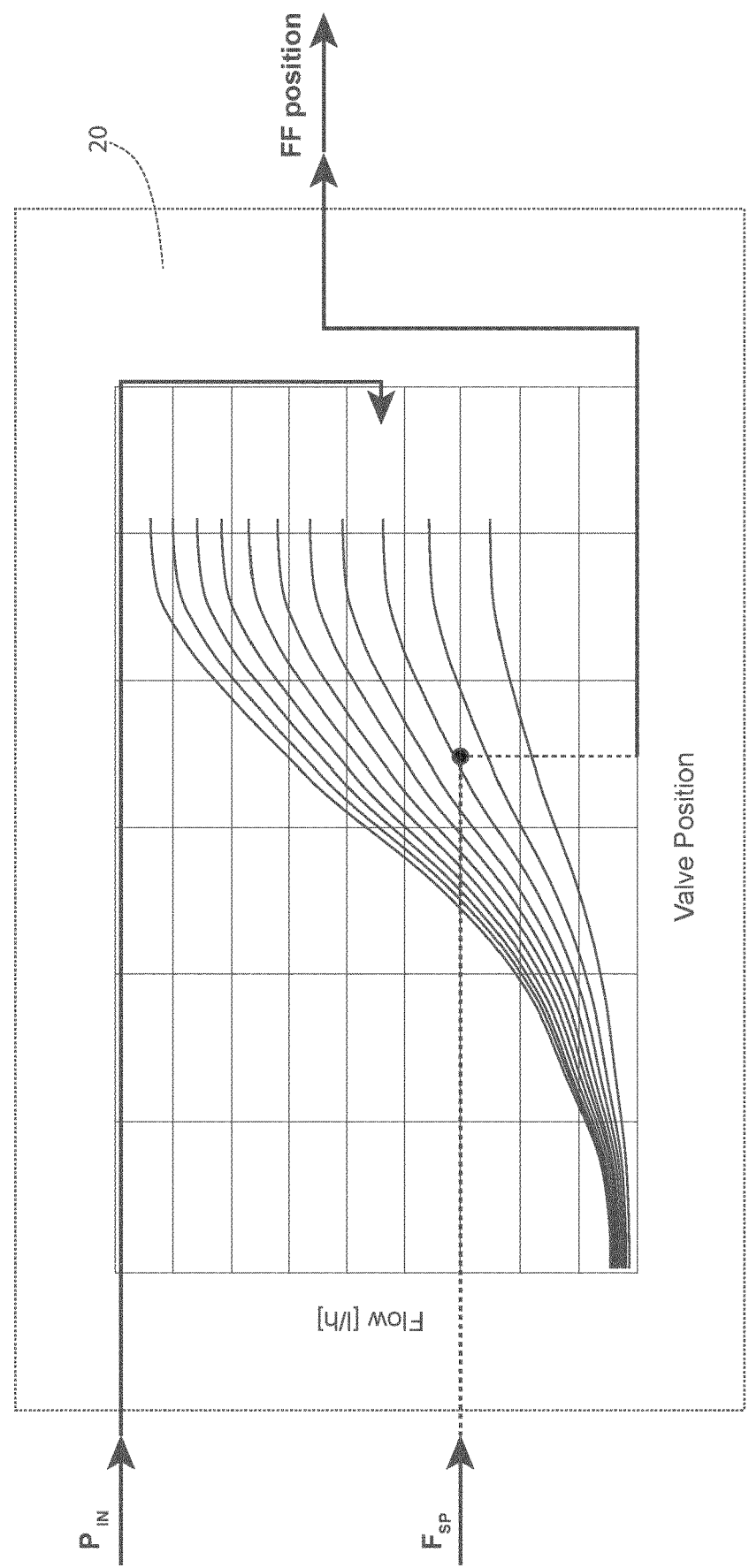
FIGS. 3-5 show plots of quantities related to the operation of the control unit of FIG. 2.

FIG. 3 shows exemplary graphs related to the fluid-dynamic maps implemented in the flow feed-forward control module 20 to determine the second control contribution $C_2$ to the controlled position of the flow regulating valve 6.

In the representation of FIG. 3, these graphs plot the flow (in the y axis) versus the valve position (in the x axis), each graph referring to a different pressure value. In particular, given the value of the inlet pressure measurement $P_{IN}$ (and thus the corresponding graph) and a flow set point $F_{SP}$, the position of the flow regulating valve 6 (representing the above discussed second control contribution $C_2$ by the feed-forward control module 20) can be found in the same corresponding graph.

Figure 4:
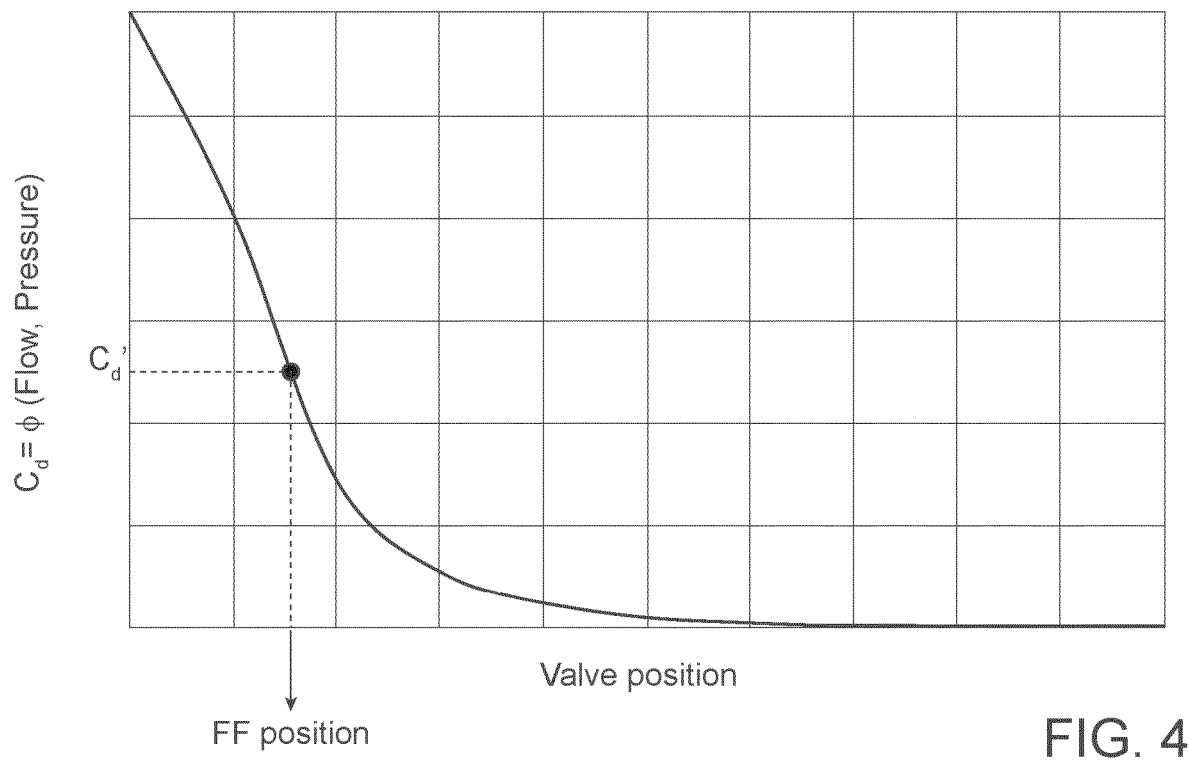

FIG. 4 shows a different representation for the same fluid-dynamic maps implemented in the flow feed-forward control module 20, where a combination variable $C_d$, which is determined as a function of both flow and pressure values, is introduced:

$$C_d = \varphi(F_{IN}, P_{IN}).$$

Again, given the values of the inlet pressure measurement $P_{IN}$ and the flow set point $F_{SP}$ (and thus a resulting value $C_d'$ of the combination variable $C_d$), the working point, i.e. the position of the flow regulating valve 6 according to the above discussed second control contribution $C_2$, may be determined in the graph.

As previously discussed, the fluid-dynamic maps stored and implemented in the flow feed-forward control module 20 are pre-determined, e.g. obtained by a characterization of the flow regulating valve 6 (or being set by design). Therefore, the same maps do not take into account different properties of the filling food product, e.g. in terms of its viscosity, and/or different operating conditions of the filling machine 1, e.g. in terms of a high volume/capacity, high pressure drop or high speed.

Figure 5:
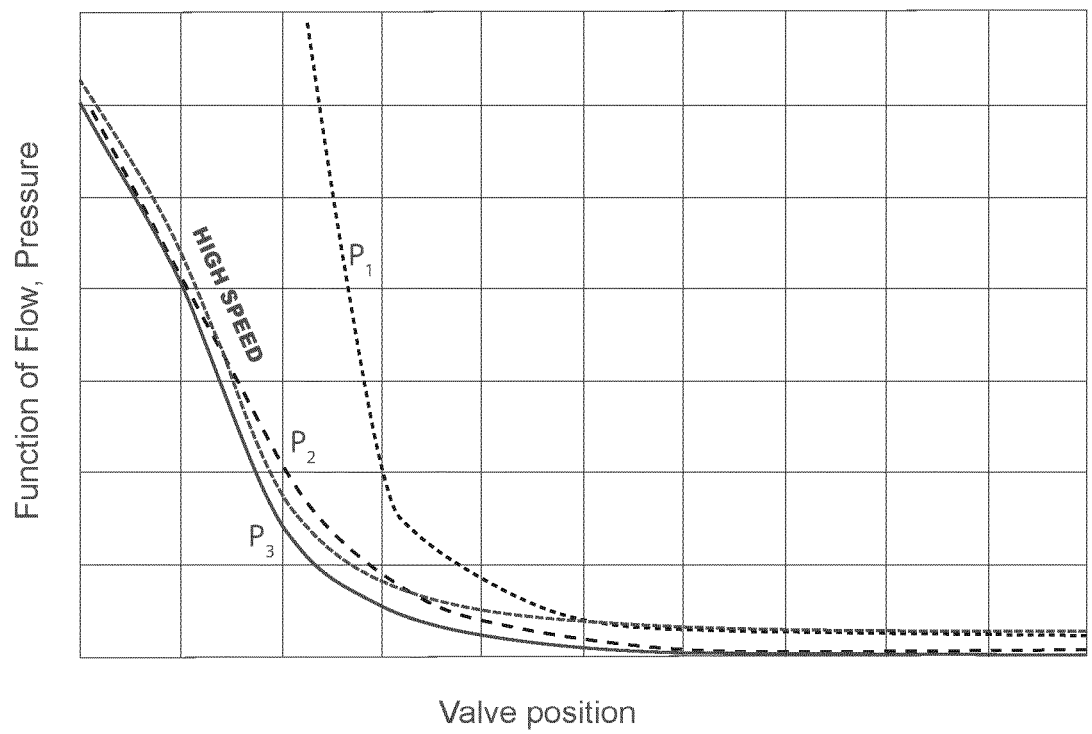

In this respect, FIG. 5 shows different plots relating to the actual model of the flow regulating valve 6, in case of different products (denoted with P1, P2, P3) and different operating conditions (e.g. a high-speed condition) of the filling machine. It is evident that the predetermined map stored in the flow feed-forward control module 20 may not be ideal in modelling the system in case of different products and/or different operating conditions, so that the position of the flow regulating valve 6 determined by the same flow feed-forward control module 20 may bring the system to a less than ideal initial working point or offset position.

As a consequence, the flow feedback control module 22, implemented by the proportional-integral-derivative (PID) module, has to compensate the offset position with the first control contribution $C_1$, determining a slower overall response by the control system.

In order to solve this issue, and according to an aspect of the present solution, the flow feed-forward control module 20 is configured to use the fluid dynamics maps in a dynamically adaptive manner, depending on the different operating characteristics of the filling machine 1 (and the related liquid food product), thereby adapting to these different characteristics.

As will be detailed in the following, according to a possible embodiment, the flow feed-forward control module 20 is configured to dynamically adapt the pre-stored fluid dynamics maps to the above different characteristics of the filling machine and related product.

Figure 6:
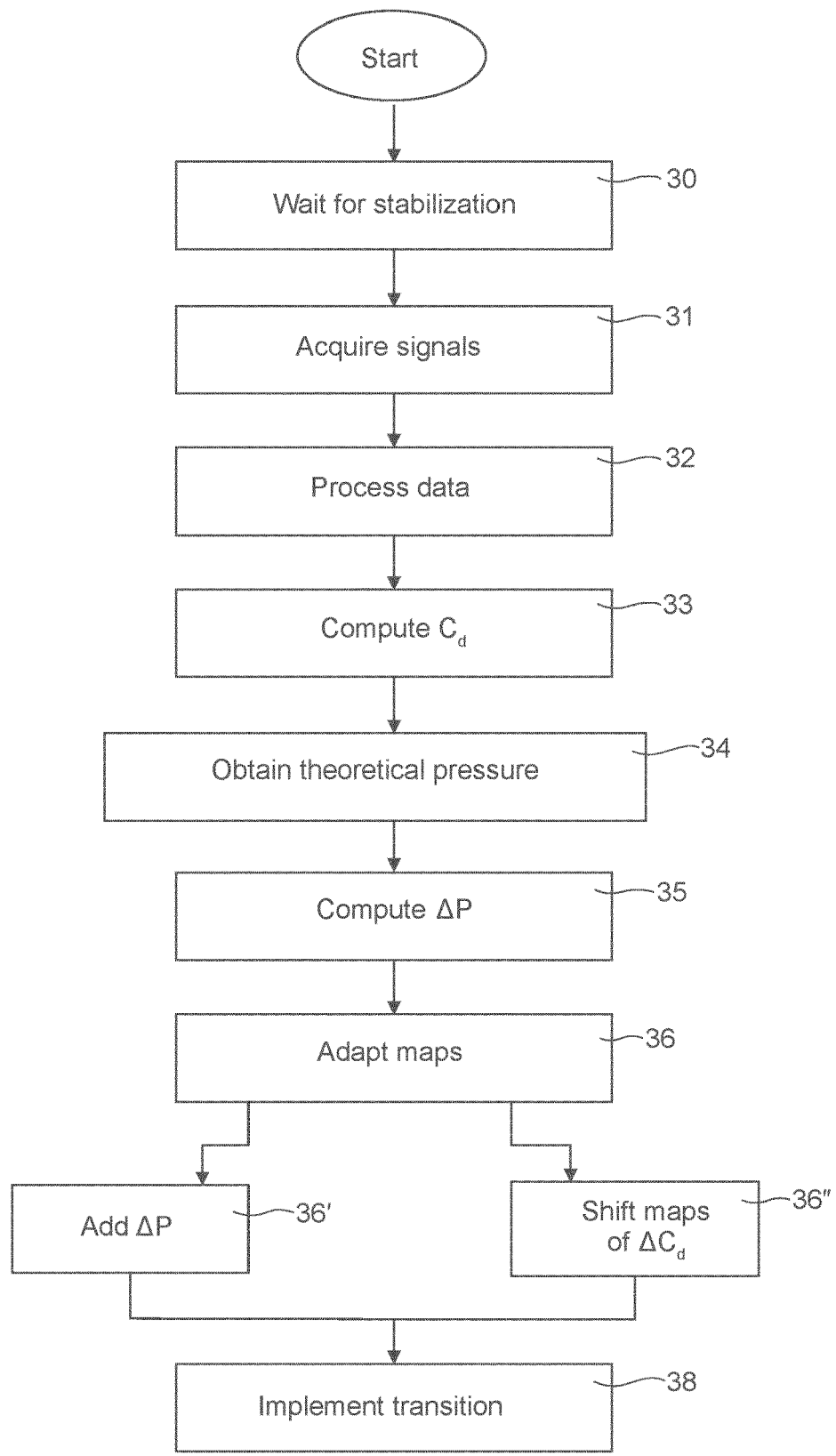
FIG. 6 is a flow chart of operations performed in the control unit of FIG. 2.

In more details, and with reference to FIG. 6, according to an aspect of the present solution, a dynamic adaptation procedure is implemented in the control unit 10 during an adaptation time interval, e.g. when the filling machine 1 starts a new production (which may imply a different liquid food product and/or different operating parameters and conditions for the same filling machine 1).

In a first step, denoted with 30, the control unit 10 may wait for stabilization of the filling operations.

As shown at step 31, operating signals indicative of the filling machine operation are then acquired for a defined period of time, in particular: the inlet product flow and pressure $F_{IN}$, $P_{IN}$ (provided by the flow meter 16 and, respectively, the pressure sensor 14); the (actual) position of the flow regulating valve 6 (e.g. determined by the position of a corresponding driving servomotor); the value of the second control contribution $C_2$ generated by the flow feed-forward control module 20.

The control unit 10 then process the received data, as shown at step 32, in order to adapt to the (possibly different)

operating conditions of the filling machine 1 and related product; according to a possible embodiment, a dynamically adapted fluid-dynamic map is determined, to be implemented in the flow feed-forward control module 20, in order to adapt to the filling machine behaviour.

In particular, a theoretical pressure value is determined, corresponding to an inlet pressure that would be required as an input to the flow feed-forward module 20 in order to match the (actual) position of the flow regulating valve 6 with the value of the second control contribution $C_2$ generated at the output of the same flow feed-forward control module 20.

In a possible embodiment, as shown starting from step 33, it is considered that the maps are expressed by means of a matrix, which represents a relation between the above discussed variable $C_d$ and the position of the flow regulating valve 6 (see above FIG. 4), $C_d$ being a function of inlet product pressure and flow.

From the determined position of the flow regulating valve 6, e.g. indirectly measured by means of a corresponding driving servomotor, the correspondent $C_d$ value is therefore computed, by means of the reverse $C_d$-valve position matrix.

At step 34, from the computed $C_d$ value, as a function of inlet product flow and pressure, the theoretical pressure value is obtained.

As shown at step 35, by computing the difference between the measured inlet product pressure $P_{IN}$ and this theoretical pressure, a delta pressure ($\Delta P$) value is obtained.

This $\Delta P$ value is then used to determine the adjustment associated with the fluid dynamic maps used in the flow feed-forward module 20, in order to adapt to the different operating conditions of the filling machine 1, at step 36.

Figure 7A:
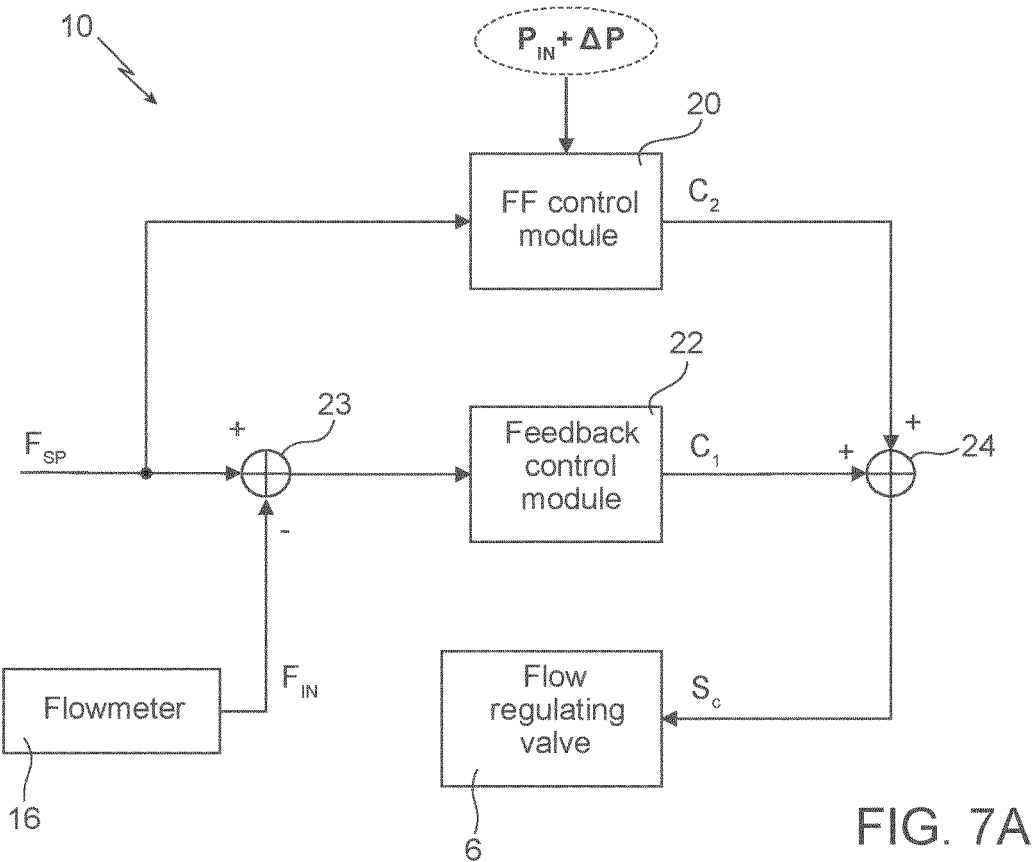
FIGS. 7A and 7B are schematic block diagrams of the control unit of the filling machine according to different embodiments.

In more details, as shown at step 36' and as also shown schematically in FIG. 7A, the computed $\Delta P$ value can be added to the measured inlet product pressure value $P_{IN}$ and the sum can be used as the input to the flow feed-forward module 20, in order to identify the correct working point on the pre-stored fluid dynamic maps. This has the effect of actually "shifting" the standard, pre-stored, fluid dynamic map (and in particular the value of the variable $C_d$) of a "$\Delta C_d$" quantity, based on the $\Delta P$ value, thereby obtaining the final map, adapted to the actual operating conditions of the filling machine 1 (e.g. to the liquid food product viscosity and/or the machine operating conditions, e.g. the corresponding speed).

As shown at step 36", in a corresponding manner, instead of adding the $\Delta P$ value to the input of the flow feed-forward module 20, the control unit 10 may actually compute the "shifted" or dynamically adapted fluid dynamic maps, as a function of the above $\Delta C_d$ quantity (in other words, computing a different, "shifted", matrix representing the relation between the variable $C_d$ and the position of the flow regulating valve 6, by means of the above expression (1) considering the sum of the inlet product pressure $P_{IN}$ and the $\Delta P$ value).

Figure 7B:
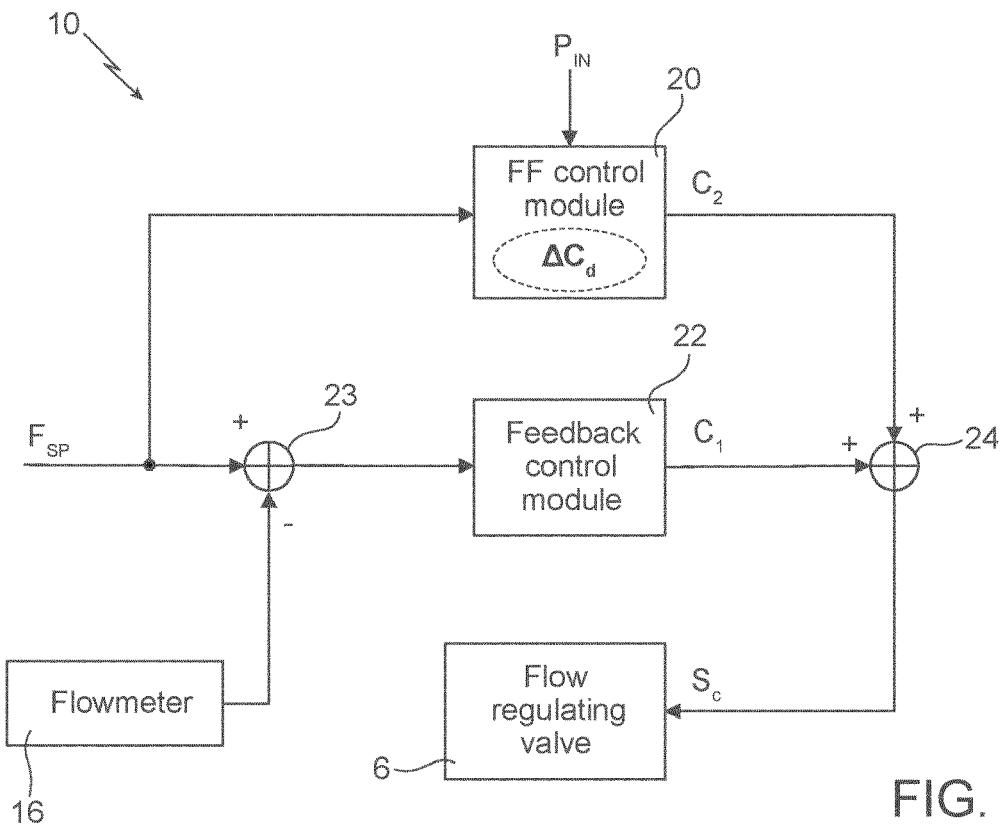

As shown schematically in FIG. 7B, this "shifted" or dynamically adapted fluid dynamic map is then used in the flow feed-forward module 20, receiving in this case at the input the "raw" inlet product pressure measurement $P_{IN}$ (as provided by the pressure sensor 14).

As shown at step 38, the control unit 10, after the above discussed determination of the adapted fluid-dynamic map, may start a transition period from the standard, pre-stored, map to the adapted map by means of a pressure ramp (starting from a fixed initial value and arriving to the above discussed sum of the inlet product pressure value $P_{IN}$ and the $\Delta P$ value).

At the end of the transition period, the value of the second control contribution $C_2$ generated at the output of the flow feed-forward control module 20 will thus substantially match the position required for the flow regulating valve 6 based on the specific filling machine/product system. Therefore, it will be possible to compensate the contribution of the (slower) flow feedback control module 22, with the (faster) flow feed-forward control module 20 representing the main contribution to the determination of the position control signal for the flow regulating valve 6 (thus achieving the desired responsiveness of the control unit 10 to possible pressure disturbances).

The new fluid-dynamic map may be used until the next production stop is requested; when the filling machine 1 is restarted, the adaptation procedure may be performed again.

Figure 8:
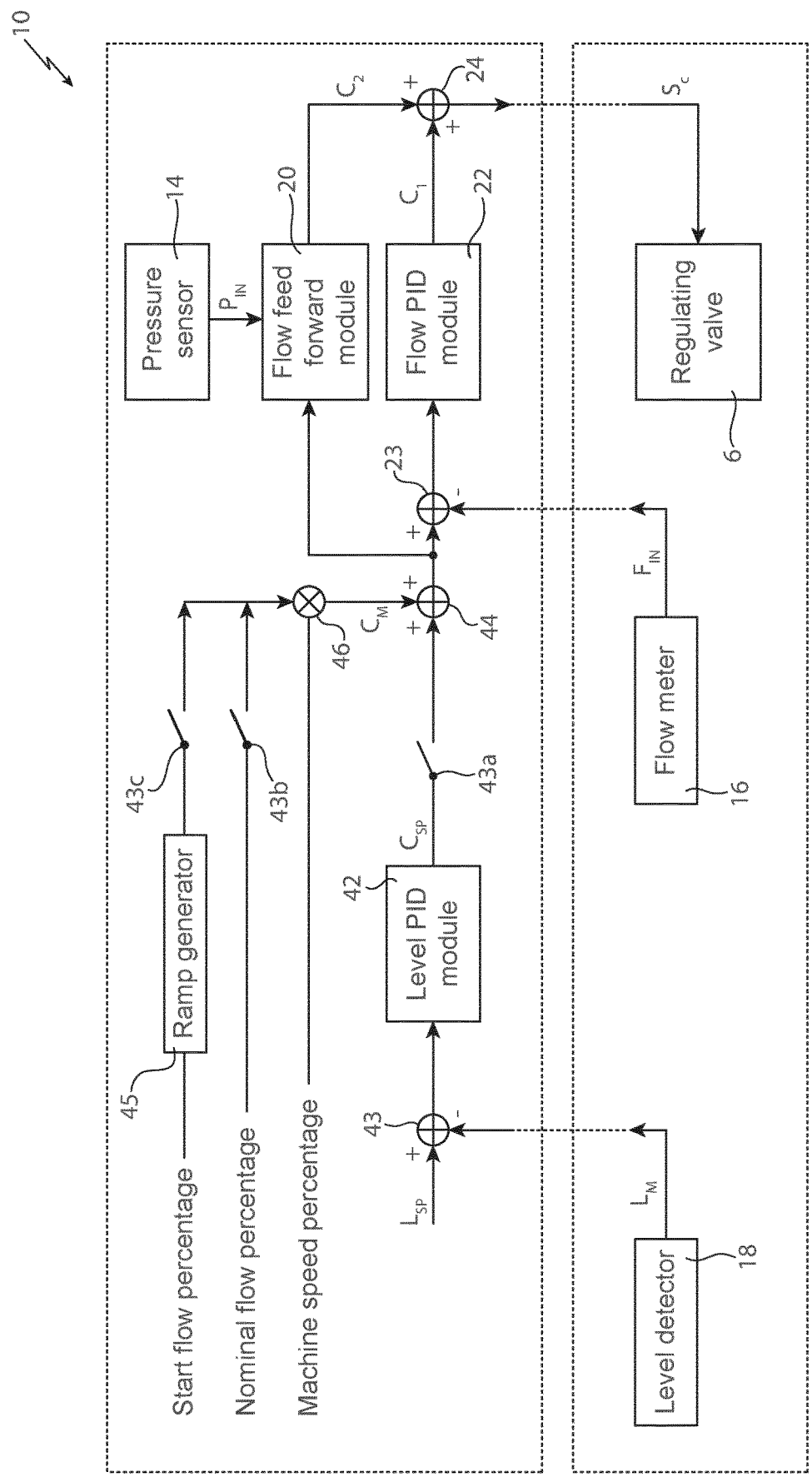
FIG. 8 is a schematic block diagram of the control unit of the filling machine according to yet a different embodiment.

As shown in FIG. 8, according to a possible embodiment, the control unit 10 may further comprise a level feedback control module 42, implemented by a respective proportional-integral-derivative (PID) module, which generates at its output a control contribution $C_{SP}$ indicative of the flow set point $F_{SP}$, based on a difference between the product level measurement $L_M$ received from the level detector 18 (representing a real product level) and a level set point $L_{SP}$ (representing a desired product level), according to proportional, integrative and derivative control actions (in any known manner, here not discussed in detail).

As shown in the same FIG. 8, the above difference between the product level measurement $L_M$ and the level set point $L_{SP}$ is performed in a summing block 43, whose output represents the input of the level feedback control module 42.

The control unit 10 implements in this case a double PID control loop, based on the pressure and level measurements, in order to adjust the flow through the regulating valve 6 with an additional control action based on the product level (so as to achieve an even more stable operation of the filling machine 1).

The control contribution $C_{SP}$ may represent the actual flow set point $F_{SP}$, provided at the input of the flow feedback control module 22.

In the embodiment shown in FIG. 8, the control contribution $C_{SP}$ is selectively provided, via a first switch 43a, to a summing block 44, which generates at the output the flow set point $F_{SP}$ and further receives at the input a machine flow contribution CM.

In particular, this machine flow contribution CM is generated by a multiplier block 46, which receives at its inputs: a machine speed percentage; and, selectively, either a nominal flow percentage (via a second switch 43b), or a start flow percentage (via a ramp generator 45 and a third switch 43c).

In a known manner, the machine flow contribution CM represents a contribution to the flow set point $F_{SP}$ used at the start of the filling machine 1.

The advantages of the discussed solution will be clear from the foregoing description.

In any case, it is underlined again that the improved control action implemented by the control unit 10 allows to achieve a more stable operation of the filling machine 1, with a more stable level of product in the filled packages, reducing waste of product and of the same packages.

The discussed solution allows to promptly adapt to the operating characteristics of the filling machine (and product), e.g. at the start of any new production or at any other suitable time.

In particular, thanks to the adaptation of the fluid dynamic maps to the filling system, the feed forward action determines the main contribution to the position of the flow regulating valve 6, with the PID action load being reduced (thus achieving a faster response to pressure disturbances).

Clearly, changes may be made to what described herein without, however, departing from the scope of protection as defined in the accompanying claims.

In particular, it is underlined that the discussed solution may be applied for any packaging or filling machine and for any kind of pourable food product.

The invention claimed is:

1. A method for controlling a flow regulating valve of a filling machine configured to form composite packages from a multilayer composite packaging material and to fill the composite packages with a pourable food product, wherein the regulating valve controls the flow of the pourable food product filling the packages, the method comprising:
   receiving an inlet pressure measurement of the pourable food product from a pressure sensor;
   receiving an inlet flow measurement of the pourable food product from a flow meter;
   determining a control signal for controlling an operating position of the flow regulating valve by combined contributions of:
   a flow feedback control module, receiving at its input a flow set point and the inlet flow measurement and generating a first control contribution indicative of a difference between the inlet flow measurement and the flow set point;
   a flow feed-forward control module, receiving at its input the inlet pressure measurement and the flow set point and generating a second control contribution as a function of the flow set point and inlet pressure measurement, using stored fluid-dynamic maps,
   wherein the flow feed-forward control module is configured to use the stored fluid dynamics maps in a dynamically adaptive manner, depending on different operating conditions of the filling machine and/or the related pourable food product, thereby adapting to said different operating conditions and/or pourable food product.

2. The method according to claim 1, comprising performing a dynamic adaptation procedure to dynamically adapt the stored fluid dynamics maps in the flow feed-forward control module to said different operating conditions of the filling machine and/or pourable food product.

3. The method according to claim 2, wherein the stored fluid dynamics maps represent a relation between the second control contribution to the operating position of the flow regulating valve and the inlet pressure measurement and flow set point; and wherein the dynamic adaptation procedure comprises:
   determining a position of the flow regulating valve;
   determining a theoretical pressure value corresponding to the pressure that would be required as an input to the flow feed-forward module in order to match the determined position of the flow regulating valve with the value of the second control contribution generated at its output;
   obtaining a delta pressure value by computing a difference between the measured inlet product pressure and said theoretical pressure;
   using said delta pressure value to determine an adjustment associated with the stored fluid dynamic maps used in the flow feed-forward module.

4. The method according to claim 3, comprising adding the computed delta pressure value to the value of the measured inlet product pressure, at the input of the flow feed-forward module.

5. The method according to claim 3, comprising shifting said stored fluid dynamic maps of a shifting quantity, being a function of the delta pressure value, thereby determining dynamically adapted fluid dynamic maps to be used in the flow feed-forward module receiving at the input the inlet pressure measurement.

6. The method according to claim 2, comprising performing the dynamic adaptation procedure when the filling machine starts a new production, implying a different pourable food product and/or different operating conditions of the filling machine.

7. The method according to claim 1, wherein the fluid dynamics maps define a relation between a variable, being a function of product pressure and flow, and the position of the flow regulating valve.

8. The method according to claim 7, wherein the dynamic adaptation procedure further comprises:
   computing a corresponding value for said variable from the position, by means of the inverse of said relation; and
   determining the theoretical pressure value from the computed value of said variable, by means of said function.

9. The method according to claim 1, wherein the flow set point is indicative of a target flow of product through the regulating valve, preferably determined as a function of one or more of: a start flow percentage, a nominal flow percentage, a machine speed flow percentage, a level set point and a product level measured by a level detector.

10. The method according to claim 1, wherein the flow feedback control module is implemented by a proportional-integral-derivative, PID, module.

11. The method according to claim 1, wherein the first and second control contributions are combined in a summing block, which generates at the output the control signal for the flow regulating valve, for modulating its operating position and thereby adjusting the flow of the pourable food product passing therethrough.

12. The method according to claim 1, further comprising:
   receiving a product level measurement from a level detector;
   determining a control contribution by a proportional-integral-derivative module, based on a difference between the product level measurement and a level set point; and
   wherein the flow set point is a function of said control contribution.

13. A control system for controlling a flow regulating valve of a filling machine configured to form composite packages from a multilayer composite packaging material and to fill the composite packages with a pourable food product, wherein the regulating valve is configured to control the flow of the pourable food product filling the packages, the control system comprising:
   a pressure sensor, configured to determine an inlet pressure measurement of the pourable food product;
   a flow meter, configured to determine an inlet flow measurement of the pourable food product;
   a control unit configured to determine a control signal for controlling an operating position of the flow regulating valve,
   wherein the control unit is configured to implement the method according to claim 1.

14. The system according to claim 13, wherein the filling machine is configured to form a tube from a web of the multilayer composite packaging material and comprises a filling pipe for filling the tube with the pourable food product, wherein the regulating valve is configured to couple the filling pipe to a product processing line, and wherein the pressure sensor and the flow meter are arranged upstream of the regulating valve with respect to a direction of flow of said pourable food product from the processing line to the filling pipe.

15. A filling machine, comprising the control system, according to claim 13.

\* \* \* \* \*